（12）United States Patent
Cooper et al.

(10) Patent No.: US 8,483,288 B2
(45) Date of Patent: **\*Jul. 9, 2013**

(54) METHODS, APPARATUS AND SYSTEM FOR FILM GRAIN CACHE SPLITTING FOR FILM GRAIN SIMULATION

(75) Inventors: Jeffrey Allen Cooper, Rocky Hill, NJ (US); Cristina Gomila, Princeton, NJ (US); Joan Llach, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1593 days.

This patent is subject to a terminal disclaimer.

(21) Appl. No.: 11/284,378

(22) Filed: Nov. 21, 2005

(65) Prior Publication Data

US 2006/0115175 A1    Jun. 1, 2006

Related U.S. Application Data

(60) Provisional application No. 60/630,049, filed on Nov. 22, 2004.

(51) Int. Cl.
*H04N 7/12* (2006.01)
(52) U.S. Cl.
USPC .................................................. 375/240.26
(58) Field of Classification Search
USPC ................ 382/100, 284, 305, 254, 274–275, 382/162–167, 232–253, 260–270; 348/96–97, 348/239, 446, 441; 375/240.01–240.29; 358/3.26–3.28, 537–540, 527; 430/21
See application file for complete search history.

(56) References Cited

U.S. PATENT DOCUMENTS

| | | | |
|---|---|---|---|
| 4,897,775 A | 1/1990 | Kaassens |
| 4,930,023 A | 5/1990 | Yakame |
| 4,935,816 A | 6/1990 | Faber |
| 4,998,167 A | 3/1991 | Jaqua |
| 5,028,280 A | 7/1991 | Ihara et al. |
| 5,140,414 A | 8/1992 | Mowry |

(Continued)

FOREIGN PATENT DOCUMENTS

| | | |
|---|---|---|
| CN | 1530252 A | 9/2004 |
| CN | 1530852 | 9/2004 |

(Continued)

OTHER PUBLICATIONS

Office Action from U.S. Appl. No. 10/556,834 mailed Aug. 19, 2008.

(Continued)

*Primary Examiner* — Ishrat I Sherali
(74) *Attorney, Agent, or Firm* — Robert D. Shedd; Robert B. Levy

(57) ABSTRACT

The present invention provides a method, apparatus and system for film grain cache splitting for film grain simulation. In one embodiment of the present invention a method for storing film grain patterns includes storing at least a first portion of film grain patterns in an internal memory and storing at least a second portion of the film grain patterns in an external memory. That is, in the present invention a method for film grain cache splitting for film grain simulation includes splitting the storage of film grain patterns between an internal cache and an external memory. In one embodiment of the present invention, the internal cache is integrated into an integrated circuit chip of a decoder.

19 Claims, 2 Drawing Sheets

U.S. PATENT DOCUMENTS

| | | |
|---|---|---|
| 5,216,556 A | 6/1993 | Steinberg et al. |
| 5,216,886 A | 6/1993 | Ewing |
| 5,262,248 A | 11/1993 | Ihara et al. |
| 5,285,402 A | 2/1994 | Keith |
| 5,285,482 A | 2/1994 | Sehier et al. |
| 5,335,013 A | 8/1994 | Faber |
| 5,374,954 A | 12/1994 | Mowry |
| 5,406,326 A | 4/1995 | Mowry |
| 5,453,840 A | 9/1995 | Parker et al. |
| 5,457,491 A | 10/1995 | Mowry |
| 5,461,596 A * | 10/1995 | Barrett ............................ 369/14 |
| 5,471,572 A | 11/1995 | Buchner et al. |
| 5,475,425 A | 12/1995 | Przyborski et al. |
| 5,526,446 A | 6/1996 | Adelson et al. |
| 5,550,815 A | 8/1996 | Cloonan et al. |
| 5,629,769 A | 5/1997 | Cookingham et al. |
| 5,641,596 A | 6/1997 | Gray et al. |
| 5,659,382 A | 8/1997 | Rybczynski |
| 5,687,011 A | 11/1997 | Mowry |
| 5,706,361 A | 1/1998 | Kent et al. |
| 5,709,972 A | 1/1998 | Cookingham et al. |
| 5,715,008 A | 2/1998 | Sekiguchi et al. |
| 5,742,892 A | 4/1998 | Chaddha |
| 5,751,398 A | 5/1998 | Beard |
| 5,767,860 A | 6/1998 | Zimmer et al. |
| 5,805,782 A | 9/1998 | Foran |
| 5,817,447 A | 10/1998 | Yip |
| 5,831,673 A * | 11/1998 | Przyborski et al. ........... 348/239 |
| 5,832,172 A | 11/1998 | Jeon |
| 5,845,017 A | 12/1998 | Keyes |
| 5,846,017 A | 12/1998 | Meyer |
| 5,859,382 A | 1/1999 | Funaki |
| 5,887,875 A | 3/1999 | Salciccioli et al. |
| 5,917,609 A | 6/1999 | Breeuwer et al. |
| 6,067,125 A | 5/2000 | May |
| 6,067,126 A | 5/2000 | Alexander |
| 6,134,200 A | 10/2000 | Timmermans |
| 6,216,838 B1 | 4/2001 | Bacher et al. |
| 6,219,836 B1 | 4/2001 | Wells et al. |
| 6,219,838 B1 | 4/2001 | Cherichetti et al. |
| 6,233,647 B1 | 5/2001 | Bentz et al. |
| 6,269,180 B1 | 7/2001 | Sevigny |
| 6,285,711 B1 | 9/2001 | Ratakonda et al. |
| 6,327,304 B1 | 12/2001 | Miller et al. |
| 6,327,391 B1 | 12/2001 | Ohnishi et al. |
| 6,370,192 B1 | 4/2002 | Pearlstein et al. |
| 6,373,992 B1 | 4/2002 | Nagao |
| 6,441,918 B1 | 8/2002 | Hori |
| 6,459,699 B1 | 10/2002 | Kimura et al. |
| 6,496,221 B1 | 12/2002 | Wolf et al. |
| 6,559,849 B1 | 5/2003 | Anderson et al. |
| 6,587,509 B1 | 7/2003 | Suzuki et al. |
| 6,650,327 B1 | 11/2003 | Airey et al. |
| 6,665,369 B2 | 12/2003 | Ukita |
| 6,667,815 B1 | 12/2003 | Nagao |
| 6,724,942 B1 | 4/2004 | Arai |
| 6,728,317 B1 | 4/2004 | Demos |
| 6,744,928 B1 | 6/2004 | Juri et al. |
| 6,839,152 B2 | 1/2005 | Fan et al. |
| 6,868,190 B1 | 3/2005 | Morton |
| 6,963,668 B2 | 11/2005 | Engeldrum et al. |
| 6,990,251 B2 | 1/2006 | Edgar |
| 6,990,252 B2 | 1/2006 | Shekter |
| 6,995,793 B1 | 2/2006 | Albadawi et al. |
| 7,065,255 B2 * | 6/2006 | Chen et al. .................... 382/260 |
| 7,092,016 B2 | 8/2006 | Morton et al. |
| 7,106,907 B2 | 9/2006 | Lin et al. |
| 7,245,783 B2 | 7/2007 | Fielding |
| 7,286,565 B1 | 10/2007 | Carr |
| 7,362,911 B1 | 4/2008 | Frank |
| 7,596,239 B2 | 9/2009 | Winger et al. |
| 7,630,005 B2 | 12/2009 | Takei |
| 7,653,132 B2 | 1/2010 | Dang |
| 7,664,337 B2 | 2/2010 | Balram et al. |
| 7,680,356 B2 | 3/2010 | Boyce et al. |
| 7,738,722 B2 | 6/2010 | Gomila et al. |
| 7,742,655 B2 | 6/2010 | Gomila et al. |
| 7,856,055 B2 | 12/2010 | Zhou et al. |
| 7,958,532 B2 | 6/2011 | Paul et al. |
| 2001/0056568 A1 | 12/2001 | Hirotsu et al. |
| 2002/0003903 A1 | 1/2002 | Engeldrum et al. |
| 2002/0016103 A1 | 2/2002 | Behnke |
| 2002/0034337 A1 | 3/2002 | Shekter |
| 2002/0106103 A1 | 8/2002 | Jones et al. |
| 2002/0133764 A1 | 9/2002 | Wang |
| 2002/0154140 A1 | 10/2002 | Tazaki |
| 2002/0163657 A1 | 11/2002 | Bogdanowicz et al. |
| 2002/0171649 A1 | 11/2002 | Fogg |
| 2003/0011615 A1 | 1/2003 | Tidwell |
| 2003/0031128 A1 | 2/2003 | Kim et al. |
| 2003/0043922 A1 | 3/2003 | Kalker et al. |
| 2003/0063778 A1 | 4/2003 | Rowe et al. |
| 2003/0068097 A1 | 4/2003 | Wilson et al. |
| 2003/0086623 A1 | 5/2003 | Berkner et al. |
| 2003/0101453 A1 | 5/2003 | Matsuyama et al. |
| 2003/0206231 A1 | 11/2003 | Chen et al. |
| 2003/0206662 A1 | 11/2003 | Avinash et al. |
| 2003/0218610 A1 | 11/2003 | Mech et al. |
| 2004/0006575 A1 | 1/2004 | Visharam et al. |
| 2004/0013308 A1 | 1/2004 | Jeon et al. |
| 2004/0022318 A1 | 2/2004 | Garrido et al. |
| 2004/0071363 A1 | 4/2004 | Kouri et al. |
| 2004/0073926 A1 | 4/2004 | Nakamura et al. |
| 2004/0101059 A1 | 5/2004 | Joch et al. |
| 2004/0179738 A1 | 9/2004 | Dai et al. |
| 2004/0184532 A1 | 9/2004 | Juri et al. |
| 2004/0208389 A1 | 10/2004 | Lin |
| 2004/0264795 A1 | 12/2004 | Fielding |
| 2006/0007460 A1 | 1/2006 | Bogdanowicz et al. |
| 2006/0013320 A1 | 1/2006 | Oguz et al. |
| 2006/0072660 A1 | 4/2006 | Jia et al. |
| 2006/0082649 A1 | 4/2006 | Gomila et al. |
| 2006/0083275 A1 | 4/2006 | Stewart et al. |
| 2006/0083316 A1 | 4/2006 | Cooper et al. |
| 2006/0083426 A1 | 4/2006 | Cooper et al. |
| 2006/0083429 A1 | 4/2006 | Joly |
| 2006/0104366 A1 | 5/2006 | Huang et al. |
| 2006/0115175 A1 | 6/2006 | Cooper et al. |
| 2006/0133686 A1 | 6/2006 | Gomila et al. |
| 2006/0182183 A1 | 8/2006 | Winger |
| 2006/0183275 A1 | 8/2006 | Schoner et al. |
| 2006/0215767 A1 | 9/2006 | Gomila et al. |
| 2006/0256853 A1 | 11/2006 | Schlockermann et al. |
| 2006/0256871 A1 | 11/2006 | Boyce et al. |
| 2006/0291557 A1 | 12/2006 | Tourapis |
| 2007/0002947 A1 | 1/2007 | Lu et al. |
| 2007/0030996 A1 | 2/2007 | Winger et al. |
| 2007/0034337 A1 | 2/2007 | Nishimoto et al. |
| 2007/0036452 A1 | 2/2007 | Llach et al. |
| 2007/0047658 A1 | 3/2007 | Tourapis et al. |
| 2007/0058866 A1 | 3/2007 | Boyce et al. |
| 2007/0058878 A1 | 3/2007 | Gomilla et al. |
| 2007/0070241 A1 | 3/2007 | Boyce et al. |
| 2007/0104380 A1 | 5/2007 | Gomila et al. |
| 2007/0117291 A1 | 5/2007 | Cooper et al. |
| 2007/0140588 A1 | 6/2007 | Balram et al. |
| 2007/0269125 A1 | 11/2007 | Llach et al. |
| 2007/0297515 A1 | 12/2007 | Gomila et al. |
| 2008/0152250 A1 | 6/2008 | Gomila et al. |
| 2008/0252781 A1 | 10/2008 | De Waele et al. |
| 2010/0104025 A1 | 4/2010 | Rose et al. |

FOREIGN PATENT DOCUMENTS

| | | |
|---|---|---|
| EP | 0364285 | 4/1990 |
| EP | 0373615 | 6/1990 |
| EP | 0679008 | 12/1993 |
| EP | 0756281 | 1/1997 |
| EP | 0788281 | 1/1997 |
| EP | 0575006 | 10/1999 |
| EP | 0622000 | 3/2000 |
| EP | 1175091 | 1/2002 |
| EP | 1215624 | 6/2002 |
| EP | 1511320 | 3/2005 |
| EP | 1815688 | 8/2007 |
| GB | 2312124 | 10/1997 |
| JP | 1156069 | 9/1989 |
| JP | 3-187661 | 8/1991 |

| | | |
|---|---|---|
| JP | 4097681 | 3/1992 |
| JP | 04349458 | 12/1992 |
| JP | 5252459 | 9/1993 |
| JP | 8079765 | 3/1996 |
| JP | 962718 | 3/1997 |
| JP | 9062718 | 3/1997 |
| JP | 9-139940 | 5/1997 |
| JP | 9139940 | 5/1997 |
| JP | 9247681 | 9/1997 |
| JP | 10-509297 | 9/1998 |
| JP | 11-250246 | 9/1999 |
| JP | 20041242 | 8/2000 |
| JP | 2001-357090 | 12/2001 |
| JP | 2001357090 | 12/2001 |
| JP | 2001357095 | 12/2001 |
| JP | 2002/057719 | 2/2002 |
| JP | 2002/344514 | 11/2002 |
| JP | 2002374541 | 12/2002 |
| JP | 2003-024326 | 1/2003 |
| JP | 200324326 | 1/2003 |
| JP | 2003163853 | 6/2003 |
| JP | 2003179923 | 6/2003 |
| JP | 2004-135169 | 4/2004 |
| JP | 2004120057 | 4/2004 |
| JP | 2004135169 | 4/2004 |
| JP | 2005/080301 | 3/2005 |
| JP | 2007/507172 | 3/2007 |
| JP | 2007/529945 | 10/2007 |
| JP | 2007-529945 | 10/2007 |
| RU | 2073913 | 9/1991 |
| RU | 2088962 | 6/1997 |
| RU | 2088962 | 8/1997 |
| RU | 2138837 | 10/1999 |
| RU | 2139637 | 10/1999 |
| WO | WO 92/06808 | 4/1992 |
| WO | WO9206409 | 4/1992 |
| WO | WO9314591 | 7/1993 |
| WO | WO 94/04880 | 3/1994 |
| WO | WO 94/04960 | 3/1994 |
| WO | WO9520292 | 7/1995 |
| WO | WO 97/10676 | 3/1997 |
| WO | WO9722204 | 9/1997 |
| WO | WO98/41026 | 9/1998 |
| WO | WO9841026 | 9/1998 |
| WO | WO 00/18109 | 3/2000 |
| WO | WO00/18109 | 3/2000 |
| WO | WO0146992 | 5/2001 |
| WO | WO 01/46992 | 6/2001 |
| WO | WO0146992 | 6/2001 |
| WO | WO0174064 | 10/2001 |
| WO | WO0177871 | 10/2001 |
| WO | WO 02/33988 | 4/2002 |
| WO | WO0251160 | 6/2002 |
| WO | WO 03/005731 | 1/2003 |
| WO | WO0305731 | 1/2003 |
| WO | WO2004034518 | 4/2004 |
| WO | WO 2004/038829 | 11/2004 |
| WO | WO 2004/095829 | 11/2004 |
| WO | WO2004095829 | 11/2004 |
| WO | WO 2004/105250 | 12/2004 |
| WO | WO2004104931 | 12/2004 |
| WO | WO2004105250 | 12/2004 |
| WO | WO 2005/027045 | 3/2005 |
| WO | WO2005/027045 | 3/2005 |
| WO | WO 2005/032143 | 4/2005 |
| WO | WO 2005/034518 | 4/2005 |
| WO | WO2005032143 | 4/2005 |
| WO | WO2005034518 | 4/2005 |
| WO | WO2005039188 | 4/2005 |
| WO | WO2005039189 | 4/2005 |
| WO | WO2006022705 | 3/2006 |
| WO | WO 2006/055208 | 5/2006 |
| WO | WO 2006/057703 | 6/2006 |
| WO | WO2006/057703 | 6/2006 |

OTHER PUBLICATIONS

Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.
McLean, I, et al., "Telecine Noise Reduction", IEE Seminar Digital Restoration of Film and Video Archives (Ref. No. 01/049), IEE Seminar Digital Restoration of Film and Video Archives, London, UK. Jan. 16, 2001, pp. 2/1-2/6.
Yan, Jacky Chun Kit, et al. "Film Grain Noise Removal and Generation for Color Images", 1997 IEEE Signal Processing Workshop on Higher-Order Statistics, Jul. 21-23, Banff, Alberta, Canada. pp. 73-76.
Yan, Jacky Chun Kit, et al. "Signal Dependent Film Grain Noise Removal and Generation Based on Higher-Order Statistics", 1997 IEEE Signal Processing Workshop on Higher-Order Statistics, Jul. 21-23, Banff, Alberta, Canada. pp. 77-81.
Al-Shaykh, Osama K., et al., "Restoration of Lossy Compressed Noisy Images", IEEE Transactions of Image Processing, vol. 8. No. 10, pp. 1348-1360, Oct. 1999.
AL-Shaykh, Osama K, et al. "Lossy Compression of Images Corrupted by Film Grain Noise", Proceedings International Conference on Image Processing, Sep. 16-19, 1996, Lausanne, Switzerland vol. I of III, pp. 805-808.
Campisi, P, et al. "Signal-dependent film grain noise generation using homomorphic adaptive filtering.", IEE Proceedings Vision, Image and Signal Processing, vol. 147, No. 3 pp. 283-287 Jun. 2000.
Yoshida, J, "Go with the Grain, Film R&D Chief Urges, for Art's Sake", EETimes, http://www.eetimes.com/showArticle.jhtml?articleID=59301162 (last checked Jul. 23, 2007).
Zhao, Lifeng, et al., "Constant Quality Rate Control for Streaming MPEG-4 FGS Video", IEEE, 2002, pp. 544-547.
Al-Shaykh, Osama K, et al., "Lossy Compression of Noisy Images", IEEE Transactions on Image Processing vol. 7, No. 12, Dec. 1998, pp. 1641-1652.
Brightwell, PJ, et al., "Automated Correction'of Film Unsteadiness, Dirt and Grain", International Broadcasting Convention, Sep. 16-20, 1994 Conference Publication, No. 397.
Oktem, R, et al., "Transform Domain Algorithm for Reducing Effect of Film Grain Noise in Image Compression", Electronics Letters, vol. 35, No. 21, Oct. 14, 1999, pp. 1830-1831.
Fischer, Marco, et al., "Image Sharpening Using Permutation Weighted Medians", Dept of Electrical Engineering, University of Delware Newark, DE, pp. 1-4.
Shahnaz, Rubeena, et al., "Image Compression in Signal-Dependent Noise", Applied Optics, vol. 38, No. 26, Sep. 10, 1999, pp. 5560-5567.
Chavel, P., et al., "Film Grain Noise in Partially Coherent Imaging", Optical Engineering, vol. 19, No. 3, May/Jun. 1980, pp. 404-410.
Zhang, Xi Min, et al., "Constant Quality Constrained Rate Allocation for FGS Video Coded Bitstreams", Proceedings of SPIE, vol. 4671, pp. 817-827, 2002.
Peng, Sharon, et al., Adaptive Frequency Weighting for Fine-Granularity-Scalability, Proceedings of SPIE, vol. 4671, pp. 840-849, 2002.
Van Der Schaar, M., et al., "Fine-Granularity for Wireless Video and Scalable Storage", Proceedings of SPIE vol. 4671, pp. 805-816, 2002.
Prades-Nebot, Josep, et al., "Rate Control for Fully Fine Grained Scalable Video Coders", Proceedings of SPIE, vol. 4671, pp. 828-839, 2002.
Yan, Rong, et al., "Efficient Video Coding with Hybrid Spatial and Fine Grain SNR Scalabilities", Proceedings of SPIE vol. 4671, pp. 850-859, 2002.
Gomila et al., "SEI Message for Film Grain Encoding", JVT of ISO/IEC MPEG & ITU-T VCEG, Document: JVT-H022, 8th Meeting: Geneva, CH, May 23-27, 2003.

Gomila et al: "SEI Message for Film Grain Encoding: Syntax and Results", JVT of ISO/IEC MPEG & ITU-T VCEG, (ISO/IEC JTC1/SC-29/WG11 and ITU-T SG16 Q.6), 7th Meeting: San Diego, CA, Sep. 2-5, 2003.

Schlockerman et al: "Film Grain Coding in H.264/AVC," JVT of ISO/IEC MPEG & ITU-T VCEG (ISO/IEC JTC1/SC29/29/WG11 and ITU-T SG16 Q.6) 9th Meeting: Sep. 2-5, 2003, San Diego.

Schoyer et al: "Block Position Dithering in DCT-Coded Sequences", Signal Processing: Image Communications, vol. 8 1996, pp. 545-549.

Video Coding Experts Group: "Addition of 'Comfort noise' as Post Processing", Telenor Satellite Services, ITU—Telecommunications Standardization Sector, Document: Q15-B-15, Aug. 20, 199.

Gomila et al: SEI Message for Film Grain Encoding, May 23-27, 2003 JVT of ISO/IEC MPEG & ITU-T VCEG 8th Meeting, Geneva CH pp. 1-15.

Illingworth et al: "Vision, Image and Signal Processing" Institution of Electrical Eng., Savoy Pl., London, UK. Jun. 2000, vol. 147, No. 3, UK ISSN 1350-245X, Ivipek 147(3) 193-296.

Conklin, Greg et al: "Dithering 5-Tap Filter for Inloop Deblocking", JVT of ISO/IEC MPEG & ITU-T VCEG, 3rd Meeting: Fairfax, Virginia May 6-10, 2002, pp. 1-16.

Byun H I et al., "Power efficient MPEG-4 decoder featuring low-complexity error resilience", ASIC, 2002. PROCEEDINGS, 2002 IEEE Asia-Pacific Conference on Aug. 6-8, 2002, Piscataway, NJ USA, IEEE, XP010602834 ISBN: 0-7803-7363-4786X.

Takashi M et al., "A 60-MW M MPEG4 Video Codec Using Clustered Voltage Scaling with Variable Supple-Voltage Scheme" IEEE Journal Of Solid-State Circuits, IEEE Service Center, Piscataway, NJ US, vol. 33, No. 11, Nov. 1998, pp. 1772-1778 XP000875471 ISSN: 0018-9200.

Pirsch P et al: "VLSI Architectures For Video Compression-A Survey" Proceedings of The IEEE, IEEE, New York, US, vol. 83. No. 2, Feb. 1, 1995, pp. 220-246 XP000501242 ISSN: 0018-9219.

Zhou X et al: "Implementation of H.264 Decoder on General-Purpose Processors with Media Instructions", Proceedings of The SPIE, SPIE, Bellingham, VA, US. vol. 5022, 2003, pp. 224-235, XP002367314.

Office Action from U.S. Appl. No. 10/552,179, mailed Sep. 1, 2010.
Office Action from U.S. Appl. No. 10/556,833, mailed May 10, 2010.
Final Office Action from U.S. Appl. No. 10/556,833, mailed Oct. 20, 2010.
Office Action ADV Action from U.S. Appl. No. 10/556,833, mailed Jan. 7, 2011.
Office Action from U.S. Appl. No. 10/556,833, mailed Feb. 15, 2011.
Office Action from U.S. Appl. No. 10/556,833, mailed May 10, 2011.
Office Action from U.S. Appl. No. 10/556,833, mailed Sep. 30, 2011.
Final Office Action from U.S. Appl. No. 10/571,148, mailed May 12, 2010.
Office Action from U.S. Appl. No. 10/571,148, mailed Sep. 10, 2010.
Office Action from U.S. Appl. No. 10/572,820, mailed Mar. 19, 2010.
Office Action from U.S. Appl. No. 10/572,820, mailed May 11, 2010.
Final Office Action from U.S. Appl. No. 10/572,820, mailed Sep. 30, 2010.
Final Office Action from U.S. Appl. No. 10/575,676, mailed Mar. 4, 2010.
Office Action from U.S. Appl. No. 10/575,676, mailed Jul. 19. 2011.
Final Office Action from U.S. Appl. No. 10/575,676, mailed Oct. 26, 2011.
Office Action from U.S. Appl. No. 10/581,151, mailed Jan. 21, 2010.
Final Office Action from U.S. Appl. No. 11/246,848, mailed Jul. 6, 2010.
Final Office Action from U.S. Appl. No. 11/246,848, mailed Oct. 13, 2010.
Office Action from U.S. Appl. No. 11/268,070, mailed Jul. 21, 2010.
Final Office Action from U.S. Appl. No. 11/268,070, mailed Nov. 12, 2010.
Office Action ADV ACTION from U.S. Appl. No. 11/268,070, mailed Jan. 11, 2011.
Office Action from U.S. Appl. No. 11/268,070, mailed Jun. 22, 2011.
Final Office Action from U.S. Appl. No. 11/273,067 mailed Aug. 4, 2010.
Office Action from U.S. Appl. No. 11/285,540 mailed Nov. 23, 2010.
Office Action from U.S. Appl. No. 11/285, 540 mailed Mar. 30, 2011.
Office Action from U.S. Appl. No. 11/667,581 mailed Jun. 8, 2011.
Final Office Action from U.S. Appl. No. 11/667,581 mailed Oct. 14, 2011.
Office Action from U.S. Appl. No. 11/667,629 mailed Jul. 9, 2010.
Final Office Action from U.S. Appl. No. 11/667,629 mailed Nov. 19, 2010.
Office Action from U.S. Appl. No. 11/667,629 mailed Jan. 13, 2011.
Final Office Action from U.S. Appl. No. 11/667,629 mailed Apr. 22, 2011.
Office Action from U.S. Appl. No. 11/667,816 mailed Sep. 15, 2011.
Office Action from U.S. Appl. No. 11/667,816 mailed Dec. 5, 2011.
Office Action from U.S. Appl. No. 11/667,846 mailed Oct. 4, 2011.
Office Action from U.S. Appl. No. 12/589,217 mailed Jul. 13, 2010.
Final Office Action from U.S. Appl. No. 12/589,217 mailed Oct. 28, 2010.
Office Action ADV ACTION from U.S. Appl. No. 12/589,217 mailed Dec. 2, 2010.
Office Action ADV ACTION from U.S. Appl. No. 10/575,676 mailed Jun. 7, 2010.

McMahon, T. et al: "High Qluaity SD and HD AVC Test Results"; Joint Video Team of ISO/IEC MPEG & ITU-T VCEG (ISO/IEC JTC1/SC29/1NG11 and ITU-T SG16 Q.6) 5th Meeting: Geneva, CH, Oct. 9-17, 2002.

Naderi, F. et al: "Estimation of Images Degraded by Film Grain Noise"; Applied Optics, vol. 17, Issue 8, pp. 1228-1237. Jan. 1, 1978.

Bjontegaard, G.: "Addition of Comfort Noise as Post Processing"; ITU-Telecommunications Standardization Sector, Study Group 16, $2^{nd}$ Meeting, Sunriver, Oregon, Sep. 8-11, 1997.

Lerner, Boris: "Fixed vs. floating point: a surprisingly hard choice" EE Times, Feb. 6, 2007, pp. 1-4.

Wiegand, T. "Version 3 of H.264/AVC", Joint Video Team of ISO/IEC MPEG & ITU-T VCEG 12th Meeting, Redmond. WA, USA, Jul. 17-23, 2004.

Sullivan et al: "The G+H.264/AVC Advanced Video Coding Standard:Overvew & Introduction to Fideilty Range Extensloris", Apps. of Dig. Image Proc. SPIE Bellinham, WA 2004 vol. 5558.

Oktem et al: "Transform Domain Algorthm for Reducing Effect of film Grain Noise in Image Compression", Electronics Letters, Aug. 26, 1999. IEE 1999.

\* cited by examiner

METHODS, APPARATUS AND SYSTEM FOR FILM GRAIN CACHE SPLITTING FOR FILM GRAIN SIMULATION

CROSS-REFERENCE TO RELATED APPLICATIONS

This application claims priority to U.S. Provisional Patent Application Ser. No. 60/630,049, filed Nov. 22, 2004, which is herein incorporated by reference in its entirety.

FIELD OF THE INVENTION

The present invention generally relates to film grain simulation and, more particularly, to methods and system for efficient, low-cost film grain simulation implementations.

BACKGROUND OF THE INVENTION

Film grain forms in motion picture images during the process of development. Film grain is clearly noticeable in HD images and becomes a distinctive cinema trait that is becoming more desirable to preserve through the whole image processing and delivery chain. Nevertheless, film grain preservation is a challenge for current encoders since compression gains related to temporal prediction cannot be exploited. Because of the random nature of the grain, visually lossless encoding is only achieved at very high bit-rates. Lossy encoders tend to suppress the film grain when filtering the high frequencies typically associated with noise and fine textures.

In the recently created H.264 I MPEG-4 AVC video compression standard, and in particular in its Fidelity Range Extensions (FRExt) Amendment 1 (JVT-K051, ITU-T Recommendation H.264 I ISO/IEC 14496-10 International Standard with Amendment 1, Redmond, USA, June 2004), a film grain Supplemental Enhancement Information (SEI) message has been defined. Such a message describes the film grain characteristics regarding attributes like size and intensity, and allows a video decoder to simulate the film grain look onto a decoded picture. The H.264 I MPEG-4 AVC standard specifies which parameters are present in the film grain SEI message, how to interpret them and the syntax to be used to encode the SEI message in binary format. The standard does not specify, however, the exact procedure to simulate film grain upon reception of the film grain SEI message.

Film grain simulation is a relatively new technology used in post-production to simulate film grain on computer-generated material, as well as during restoration of old film stocks. For this kind of applications, there exists commercial software in the market like Cineon®, from Eastman Kodak Co, Rochester, N.Y., and Grain Surgery™, from Visual Infinity. These tools require user interaction and are complex to implement, which makes them unsuitable for real-time video coding applications. Furthermore, none of these tools has the capability to interpret a film grain SEI message as specified by the H.264/AVC video coding standard.

SUMMARY OF THE INVENTION

The present invention provides a method, apparatus and system for film grain cache splitting for film grain simulation.

In one embodiment of the present invention a method for storing film grain patterns includes storing at least a first portion of film grain patterns in an internal memory and storing at least a second portion of the film grain patterns in an external memory.

In an alternate embodiment of the present invention an apparatus for film grain simulation includes a means for receiving at least an encoded image and supplemental information including film grain characterization information for use in a film grain simulation process, an internal storage means for storing at least a first portion of film grain patterns, and an external storage means for storing at least a second portion of the film grain simulation patterns.

In an alternate embodiment of the present invention a system for simulating film grain includes a decoder for receiving at least an encoded image and a supplemental information message including film grain characterization information for use in a film grain simulation process, an internal storage means for storing at least at least a first portion of film grain patterns, and an external storage means for storing at least a second portion of the film grain simulation patterns, wherein the internal storage means is located in the decoder.

BRIEF DESCRIPTION OF THE DRAWINGS

The teachings of the present invention can be readily understood by considering the following detailed description in conjunction with the accompanying drawings, in which.

Figure 1:
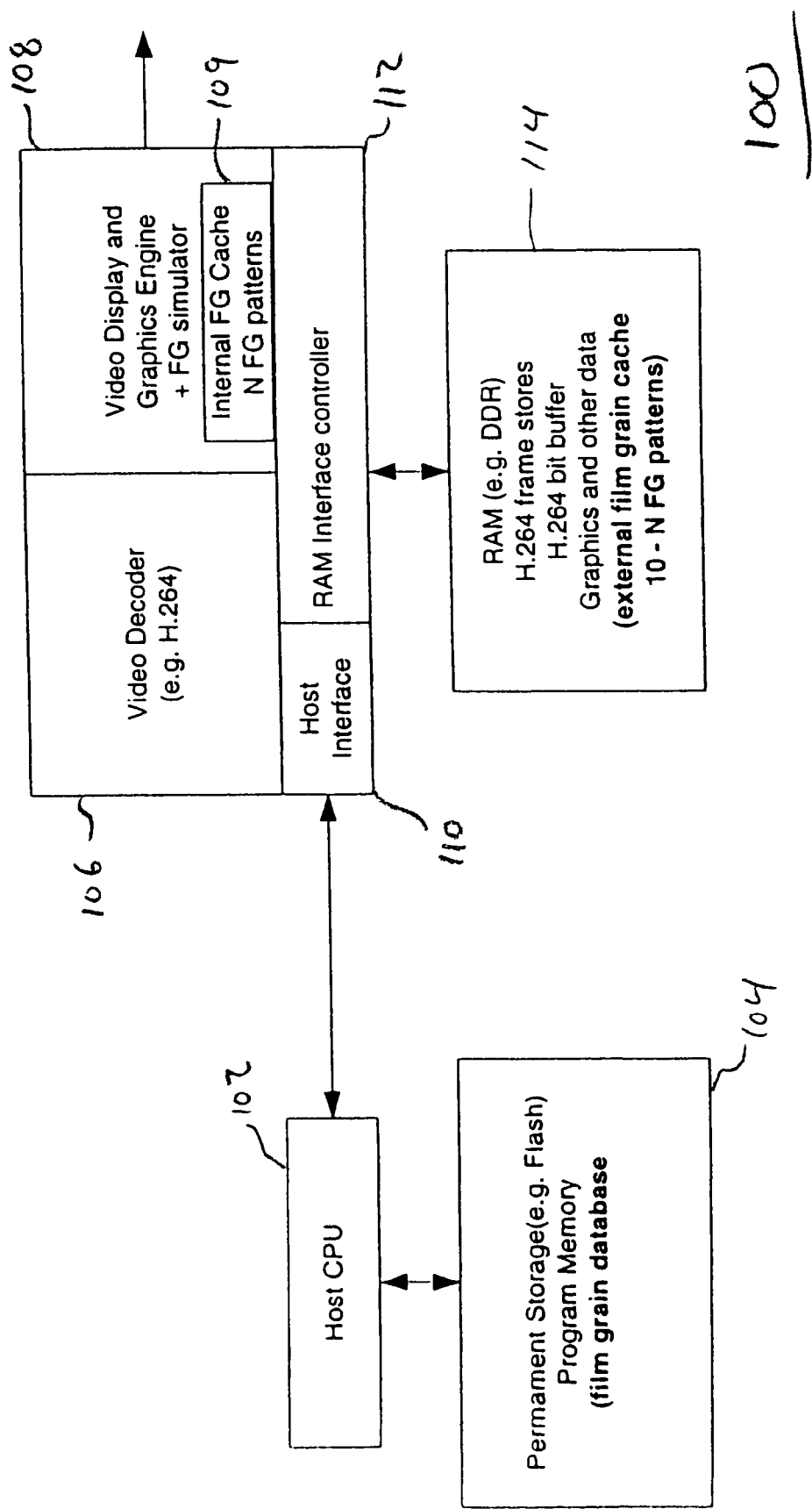
FIG. 1 depicts a high level block diagram of a video decoder subsystem having film grain simulation capabilities in accordance with one embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides methods, apparatuses and systems for film grain cache splitting for film grain simulation. Although the present invention will be described primarily within the context of a video decoder subsystem for application in, for example, IC designs for consumer HD DVD players, the specific embodiments of the present invention should not be treated as limiting the scope of the invention. It will be appreciated by those skilled in the art and informed by the teachings of the present invention that the concepts of the present invention can be advantageously applied in any film grain simulation processes in, for example, media player/receiver devices, decoders, set-top boxes, television sets or the like.

FIG. 1 depicts a high level block diagram of a video decoder subsystem having film grain simulation capabilities in accordance with one embodiment of the present invention. The video decoder subsystem 100 of FIG. 1 illustratively comprises a video decoder (illustratively a H.264 decoder) 106, a video display and graphics engine and film grain simulator 108, a host interface 110, an interface controller (illustratively a RAM interface controller) 112, and a memory (illustratively an external Ram memory) 114 implemented as a film grain cache for storing at least a small subset of the film grain patterns of the remote film grain database 104. The video display and graphics engine and film grain simulator 108 of FIG. 1 illustratively further comprises internal storage capabilities illustratively depicted as internal film grain cache 109. Although in FIG. 1, the internal film grain cache 109 is depicted as being located in the video display and graphics engine and film grain simulator 108, in alternate embodiments of the present invention, the internal film grain cache of the present invention may be located internal to the video decoder 106 or other components of the video decoder subsystem 100 of FIG. 1.

FIG. 1 further depicts a host CPU 102 and a permanent storage program memory (illustratively a remote permanent storage memory) 104 comprising a film grain database. Although in the video decoder subsystem 100 of FIG. 1, the host CPU 102 and the remote film grain database 104 are depicted as comprising separate components, in alternate embodiments of the present invention, the remote film grain database 104 can be located in a permanent memory of the CPU 102. Furthermore, although in the video decoder subsystem 100 of FIG. 1, the video decoder 106, the video display and graphics engine 108, the host interface 100, and the interface controller 112 are depicted as comprising separate components, in alternate embodiments of the present invention, the video decoder 106, the video display and graphics engine 108, the host interface 100, and the interface controller 112 can comprise a single component and can be integrated in a single integrated system-on-chip (SoC). In such an embodiment, the video decoder subsystem 100 of FIG. 1 would comprise an internal on chip film grain cache 109 and an external film grain cache 114.

Furthermore, although in the video decoder subsystem 100 of FIG. 1, the means for storing the film grain patterns are depicted as an external Ram memory 114 (cache), an internal cache memory 109 and a remote film grain database 104, in alternate embodiments of the present invention, substantially any accessible storage means may be implemented to maintain a subset of the film grain patterns and the total number of film grain patterns. Such means may include storage disks, magnetic storage media, optical storage media or substantially any storage means. In addition, one or more storage means may be implemented for each of the storage devices. Even further, although the film grain database 104 of FIG. 1 is depicted as being located remotely from the external Ram memory 114 and the internal cache memory 109, in alternate embodiments of the present invention, the film grain patterns storage means may be located in close proximity or at great distances from each other.

In film grain simulation systems such as the video decoder subsystem 100 of FIG. 1, the remote film grain database 104 is typically relatively large. In one embodiment of the present invention, the H.264 video decoder 106, the video display and graphics engine 108, the host interface 110, the interface controller 112, and the external Ram memory 114 comprise components of an HD DVD player. Film grain patterns from the remote film grain database 104 are needed to be accessed at the sample rate of, for example, the HD DVD player. Therefore, fast access to the large film grain database 104 is necessary. In the video decoder subsystem 100 of FIG. 1 in accordance with the present invention, only a small portion of the remote film grain database 104 is used during Supplemental Enhancement Information (SEI) film grain periods, which are leveraged to develop a caching technique to reduce complexity.

More specifically, the film grain simulation process of FIG. 1 requires the decoding of film grain SEI messages, conveyed in the International Standard ITU-T Rec. H.264 I ISO/IEC 14496-10 bit-streams as specified by Amendment 1 (Fidelity Range Extensions), which are both herein included by reference in their entireties. In one embodiment of the present invention, film grain SEI messages are sent preceding I (intra-coded) pictures, and only one film grain SEI message precedes a particular I picture.

Figure 2:
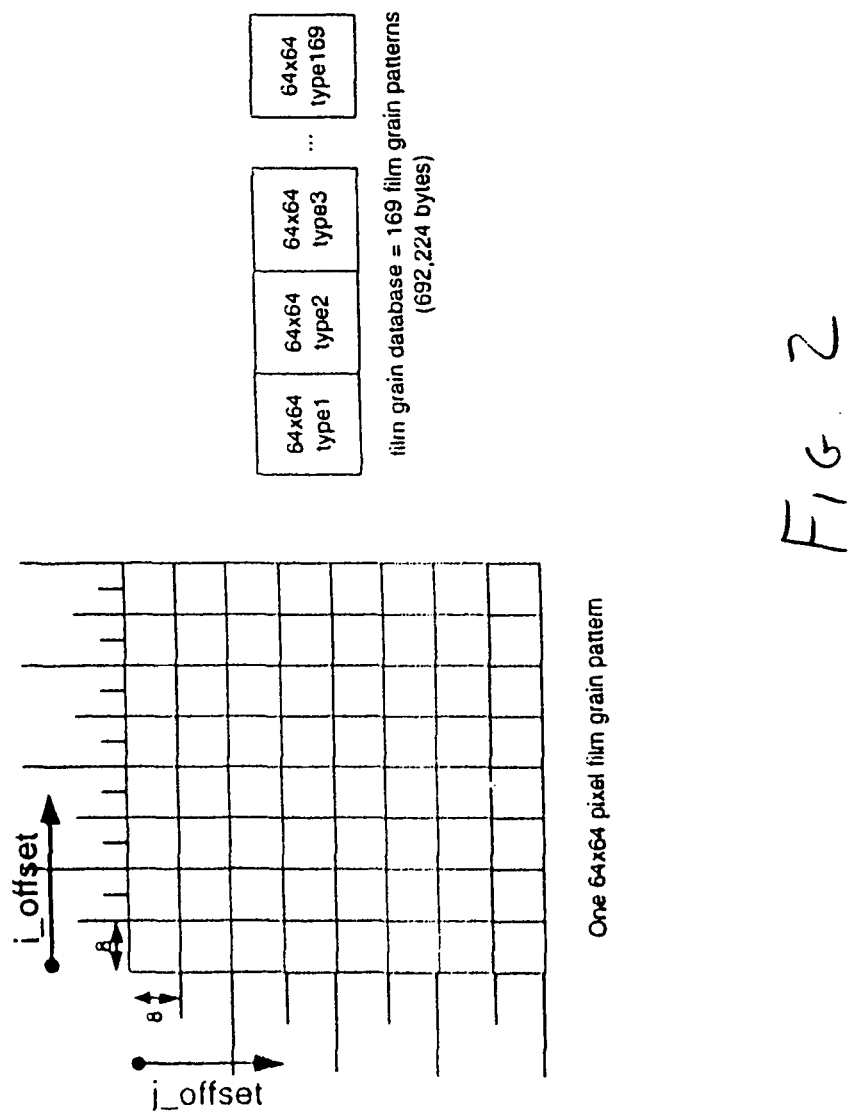
FIG. 2 depicts a high level block diagram of a typical arrangement of the film grain database of FIG. 1.

In one embodiment of the present invention and in accordance with the standards specifications, the remote film grain database 104 of film grain patterns is composed of 169 patterns of 4,096 film grain samples, each representing a 64×64 film grain image. For example, FIG. 2 depicts a high level block diagram of a typical arrangement of the film grain database of FIG. 1. FIG. 3 depicts a 64×64 sample film grain pattern with i_offset in the x-axis and j_offset in the y-axis. FIG. 2 further depicts the 169 film grain patterns of the various types.

In the film grain database 104, each film grain pattern is synthesized using a different pair of cut frequencies according to a frequency filtering model of the standard specifications. The cut frequencies transmitted in the SEI message are used to access the remote film grain database 104 of film grain patterns during the film grain simulation process. The film grain database 104 is stored in ROM, Flash, or other permanent storage device, such as the film grain database 104 of the video decoder subsystem 100 of FIG. 1, and typically does not change. The film grain database 104 contains random film grain patterns in a very large variety of film grain shapes and sizes. However, for a specific video content sequence only a small subset of this database is actually needed to effectively simulate film grain. The specification limits the number of film grain patterns to a small subset for any SEI message period. Therefore, the present invention implements small film grain caches, such as the external Ram memory 114 and the internal cache memory 109, which are updated on receipt of SEI messages.

Typically, the remote film grain database 104 is stored in the permanent storage of the host CPU 102 or at the site of the host CPU 102. However, it is the video decoder 106 and the video display and graphics engine 108 that need fast access to the film grain database 104. As such, and in accordance with the present invention, the external memory 114 and the internal cache 109 are provided for fast access to at least a subset of the film grain patterns. That is, at least a small subset of the film grain patterns needed or most implemented by the existing SEI message period is transferred to and stored in the external memory 114 and the internal cache 109 as described below.

More specifically, in accordance with the present invention, a solution that minimizes the overall design cost of a film grain simulation system, such as the video decoder subsystem 100 of FIG. 1, is to split the storage of film grain patterns between the cache internal to the decoder IC 109 and the remaining external memory 114. For example, in an implementation where a total of 10 film grain patterns are to be stored, if the internal cache 109 stores N film grain patterns, then the external memory 114 stores the remaining 10-N film grain patterns. Splitting the storage of film grain patterns between an internal cache 109 and an external memory 114 in accordance with the present invention provides reduced internal memory size requirements resulting in reduced chip area and reduced typical and average memory bandwidth over solutions having only an external memory for storing film grain patterns. In various embodiment of the present invention, the memory bandwidth (BW) required for film grain simulation in accordance with the present invention can be reduced to zero since not all stored film grain patterns are used for a specific film content.

In embodiments of the present invention, different cache splits can be used for storing necessary film grain patterns. That is, in accordance with the present invention, any split is possible. The more film grain patterns that are stored in the internal cache 109, the lower the probability that the worst case external memory BW will be needed. In addition, since not all of the film grain cache is needed during a given content simulation, in many cases the memory BW is reduced significantly.

For example, in one embodiment of the present invention in which ten (10) film grain patterns are to be stored, if half (5) of the film grain patterns are stored in an internal cache, such as the internal cache 109 of the video decoder subsystem 100 of FIG. 1, then the internal memory size is half of a total memory required to store the 10 film grain patterns. In such an embodiment of the present invention, the memory bandwidth for most content is reduced below 36 Mbytes/sec, and for some cases will be much less.

If, in the example described above, only one (1) of the film grain patterns out of ten is to be stored in the internal cache (e.g., N=1), then only a very small amount of internal cache is needed in such an embodiment of the present invention. Such an embodiment of the present invention requires only a very small additional chip area for providing the internal cache required to store only one film grain pattern. In such an embodiment, the memory BW would be reduced by a significant amount since the most frequently implemented film grain pattern can be placed in the internal cache.

In an alternate embodiment of the present invention, an internal cache and external memory are implemented for separately storing luma and chroma components. That is, the luma can be placed in internal cache, while the chroma can be placed in external memory. In this embodiment of the present invention, it is guaranteed that the worst case memory BW for film grain simulation is 36 Mbytes/sec (chroma only) and the internal cache size only needs to hold the luma portion of the cache. However, such embodiments of the present invention require that film grain simulation specifications include a definition of the split between luma cache size and chroma cache size for configuring the internal cache and the external memory.

In an embodiment of the luma/chroma split of the present invention in which only one component of chroma is stored in the external memory, the memory BW is lowered to 18 Mbytes per second. Such an embodiment requires more internal cache but less than a maximum.

In another embodiment of the present invention, the SEI message of the film grain simulation process includes additional information indicating a priority order for the stored film grain patterns. This priority order is used by, for example, the video decoder subsystem 100 of FIG. 1, to store the most frequently required film grain patterns in the internal cache of the decoder IC, therefore optimizing the use of the internal cache and minimizing external memory BW. For film grain simulation processes, this could be accomplished with a new SEI syntax element characterized by equation one (1) as follows:

$$fg\_pattern_{13}priority\text{--specifies the }[h,v]\text{ pairs of cut frequencies in priority order.}[h,v]=(comp\_model\_value[j][i][1], comp\_model\_value[j][i][2]). \quad (1)$$

In another embodiment of the present invention, a priority order of film grain patterns is derived from a standardized film grain SEI message. That is, since the SEI message contains a list of intensity intervals, each one with its own film grain parameters, the intensity intervals could be listed according to their priority (instead of being listed with increasing intensity interval bounds). It should be noted that this change is compliant with the H.264 I MPEG AVC standard. Then, for each color component, the first N film grain patterns are stored in the internal cache because those first N film grain patterns are the film grain patterns most implemented. In addition, rules can be generated to prioritize between color components. For example, up to the first N/2 Y film grain patterns, up to the first N/4 U film grain patterns, and up to the first N/4 V film grain patterns are placed in the internal cache, while the remaining film grain patterns being are stored in the external memory.

Having described various embodiments for methods, apparatus and systems for film grain cache splitting for film grain simulation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for storing film grain patterns having luma and chroma components, the storing occurring in a priority order, comprising:
    storing at least a first portion of said film grain patterns in an internal memory; and
    storing at least a second portion of said film grain patterns in an external memory;
    wherein the luma components and chroma components of said film grain patterns are stored separately in said internal memory and said external memory.

2. The method of claim 1, wherein said internal memory is located in a video decoder.

3. The method of claim 1, wherein said internal memory is located in a video decoder integrated circuit chip.

4. The method of claim 3, wherein only a small portion of said film grain patterns are stored in said internal memory such that only a small additional chip area is required for providing said internal memory.

5. The method of claim 1, wherein said internal memory stores at least film grain patterns most commonly implemented in a film grain simulation process.

6. The method of claim 1, wherein said internal memory and said external memory together store all film grain patterns required in a film grain simulation process.

7. The method of claim 1, wherein said luma components are stored in said internal memory and said chroma components are stored in said external memory.

8. The method of claim 1, wherein the priority order for storing said film grain patterns in said internal memory and said external memory is derived from a standardized film grain supplemental information message.

9. A method for storing film grain patterns for a film grain simulation process, the storing occurring in a priority order, comprising:
    splitting the storage of film grain patterns between an internal cache and an external memory;
    wherein the priority order for storing, said film rain patterns in said internal memory and said external memory is derived from a standardized film grain supplemental information message.

10. The method of claim 9, wherein said internal cache is located in a video decoder.

11. The method of claim 9, wherein said internal cache is located in a video decoder integrated circuit chip.

12. The method of claim 11, wherein only a small portion of said film grain patterns are stored in said internal cache such that only a small additional chip area is required for providing said internal cache.

13. The method of claim 9, wherein said internal cache stores at least film grain patterns most commonly implemented in said film grain simulation process.

14. An apparatus, comprising:
  a means for receiving at least an encoded image and supplemental information including film grain characterization information for use in a film grain simulation process;
  an internal storage means for storing at least a first portion of film grain patterns in a priority order; and
  an external storage means for storing at least a second portion of said film grain simulation patterns in a priority order;
  wherein the priority orders for storing said film grain patterns in said internal memory and said external memory derived from a standardized film grain supplemental information message.

15. The apparatus of claim 14, wherein said means for receiving comprises a decoder.

16. The apparatus of claim 14, wherein said internal storage means comprises an internal cache.

17. The apparatus of claim 14, wherein said internal storage means comprises at least film grain patterns most commonly implemented in said film grain simulation process.

18. A system for simulating film grain, comprising:
  a decoder for receiving at least an encoded image and a supplemental information message including film grain characterization information for use in a film grain simulation process;
  an internal storage means for storing at least at least a first portion of film grain patterns in a priority order; and
  an external storage means for storing at least a second portion of said film grain simulation patterns in a priority order;
  wherein the priority orders for storing said film grain patterns in said internal memory and said external memory are derived from a standardized film grain supplemental information message.

19. The system of claim 18, wherein said internal storage means is located in said decoder.

* * * * *